United States Patent
Mertens et al.

(10) Patent No.: US 8,239,091 B2
(45) Date of Patent: Aug. 7, 2012

(54) METHOD FOR DETECTING A "ROTATING STALL" FAULT IN A COMPRESSOR FED BY AN INVERTER

(75) Inventors: Axel Mertens, Wedemark (DE); Gerhard Neeser, Neunkirchen (DE)

(73) Assignee: Siemens Aktiengesellschaft, München (DE)

( * ) Notice: Subject to any disclaimer, the term of this patent is extended or adjusted under 35 U.S.C. 154(b) by 373 days.

(21) Appl. No.: 12/671,116

(22) PCT Filed: Jul. 28, 2008

(86) PCT No.: PCT/EP2008/059853
§ 371 (c)(1),
(2), (4) Date: Jan. 28, 2010

(87) PCT Pub. No.: WO2009/016145
PCT Pub. Date: Feb. 5, 2009

(65) Prior Publication Data
US 2010/0198480 A1    Aug. 5, 2010

(30) Foreign Application Priority Data
Jul. 30, 2007  (DE) .......................... 10 2007 035 712

(51) Int. Cl.
*G06F 19/00* (2006.01)
(52) U.S. Cl. .................. 701/31.7; 701/100; 415/118
(58) Field of Classification Search .................. 701/29.1, 701/31.7, 32.8, 100; 415/17, 27, 118; 340/966
See application file for complete search history.

(56) References Cited

U.S. PATENT DOCUMENTS

| | | | |
|---|---|---|---|
| 6,098,010 A | 8/2000 | Krener | |
| 6,536,284 B2 * | 3/2003 | Bonanni | 73/660 |
| 6,715,984 B2 * | 4/2004 | Nakajima et al. | 415/1 |
| 2005/0007044 A1 | 1/2005 | Qiu et al. | |
| 2005/0144965 A1 | 7/2005 | Ueda et al. | |
| 2006/0147301 A1 | 7/2006 | Ueda et al. | |

FOREIGN PATENT DOCUMENTS

DE    102004060206 B3    6/2006

OTHER PUBLICATIONS

J.M. Sorokes; Rotating Stall—An Overview of Dresser-Rand Experience; [Online] Dresser-Rand, Olean, NY, USA; Magazine; US (= 2007Q13156), Feb. 19, 2003, pp. 1-22, XP007906222-.

* cited by examiner

*Primary Examiner* — Richard M. Camby
(74) *Attorney, Agent, or Firm* — Henry M. Feiereisen; Ursula B. Day

(57) ABSTRACT

The invention relates to a method for detecting a rotating stall fault in a compressor (12) which is driven by means of a three-phase current motor (8) fed by an inverter. According to the invention, an instantaneous estimated value (^m) which is calculated from measured power converter output currents (iS1, iS2, iS3) and a measured rotational-speed-proportional signal (ω) is compared with an instantaneous setpoint value (m*) determined from a measured rotational-speed-proportional signal (ω) and a predetermined rotational-speed-proportional signal (ω*), in such a way that in the case of inequality a signal (SRS) is generated which indicates that the rotating stall fault has occurred. In this way, it is possible for the rotating stall fault to be detected without pressure sensors and/or oscillation pickups in a compressor (12) which is driven with a three-phase current motor (8) fed by inverter.

7 Claims, 2 Drawing Sheets

US 8,239,091 B2

METHOD FOR DETECTING A "ROTATING STALL" FAULT IN A COMPRESSOR FED BY AN INVERTER

CROSS-REFERENCES TO RELATED APPLICATIONS

This application is the U.S. National Stage of International Application No. PCT/EP2008/059853, filed Jul. 28, 2008, which designated the U.S. and has been published as International Publication No. WO 2009/016145 and which claims the priority of German Patent Application, Ser. No. 10 2007 035 712.7, filed Jul. 30, 2007, pursuant to 35 U.S.C. 119(a)-(d).

BACKGROUND OF THE INVENTION

The invention relates to a method for detecting a "rotating stall" fault in a compressor which is driven by a converter-fed three-phase AC motor.

The following faults can occur when operating compressors, namely "surge", "stall" and "rotating stall" faults. In the publication with the title "Rotating Stall —An Overview of Dresser-Rand-Experience" by J. M. Sorokes, published February 2003 by the Dresser-Rand Company, Houston, Tex., these faults are briefly explained before discussing the "rotating stall" fault in detail.

The "rotating stall" fault frequently precedes the "surge" fault. Both faults are permissible to a limited extent, but because of the vibrations which occur with the "rotating stall" fault, this gives rise to material fatigue. This "rotating stall" fault has previously only been detected in large compressors with the help of pressure sensors and/or vibration recorders. The quality and the selectivity of the detection depend on the positioning and the number of sensors and/or recorders. These pressure sensors and/or vibration recorders are laborious to install and evaluate. When using pressure sensors, problems can occur relating to the sealing of the installation points and relating to the selectivity of the state detection.

A compressor which is driven by a converter-fed three-phase AC machine is disclosed in DE 10 2004 060 206 B3. The converter used has a field-oriented closed-loop control system. According to this patent specification, a method for operating a converter-fed compressor is specified with which the duration and intensity of surge states are intended to be significantly reduced. With this method, an actual operating state of the compressor is determined from signal variables from the compressor drive converter and a stored pump limit characteristic. By using signal variables from the converter-fed three-phase machine, it can very quickly be established whether an inadmissible operating state exists. The variables torque-forming current component and the actual speed value from the drive converter are used for this purpose. A pump limit characteristic and a speed-dependent torque characteristic are also required for this method.

SUMMARY OF THE INVENTION

The invention is now based on the object of specifying a method for detecting a "rotating stall" fault in a converter-fed compressor, with which signal variables from the drive converter are used.

According to the invention, this object is achieved by a method for detecting a "rotating stall" fault in a compressor driven by a converter-fed three-phase motor, with the steps of measuring converter output currents and a signal proportional to a motor speed, calculating from the measured converter output currents and the measured speed-proportional signal an estimated torque value, comparing the estimated torque value with a nominal torque value determined from the measured speed-proportional signal and a predetermined speed-proportional signal and, if the estimated torque value is different from the nominal torque value, generating a fault signal which indicates that a "rotating stall" fault has occurred.

This invention is based on the knowledge that, with a converter-fed compressor, a rotating stall leads to a dip in the armature current of the converter-fed three-phase motor driving the compressor.

With the method according to the invention, a torque-forming current component, which is equivalent to an estimated value of torque, is calculated from measured converter output currents. A setpoint for a torque-forming current component, which is equivalent to a torque setpoint, is determined depending on a measured speed-proportional signal and a predetermined speed-proportional signal by means of a closed-loop speed control. The estimated value of motor torque which is present in the field-oriented closed-group control system is compared with a fixed motor torque setpoint. If this estimated value deviates from the fixed motor torque setpoint, a "rotating stall" fault exists.

Using drive variables which are already available enables additional pressure sensors and/or vibration recorders to be dispensed with.

Advantageous embodiments of the method according to the invention can be seen from the dependent claims 2 to 7.

BRIEF DESCRIPTION OF THE DRAWING

To further explain the invention, reference is made to the drawing in which an embodiment of a device for carrying out the method according to the invention is shown schematically.

DETAILED DESCRIPTION OF PREFERRED EMBODIMENTS

Figure 1:
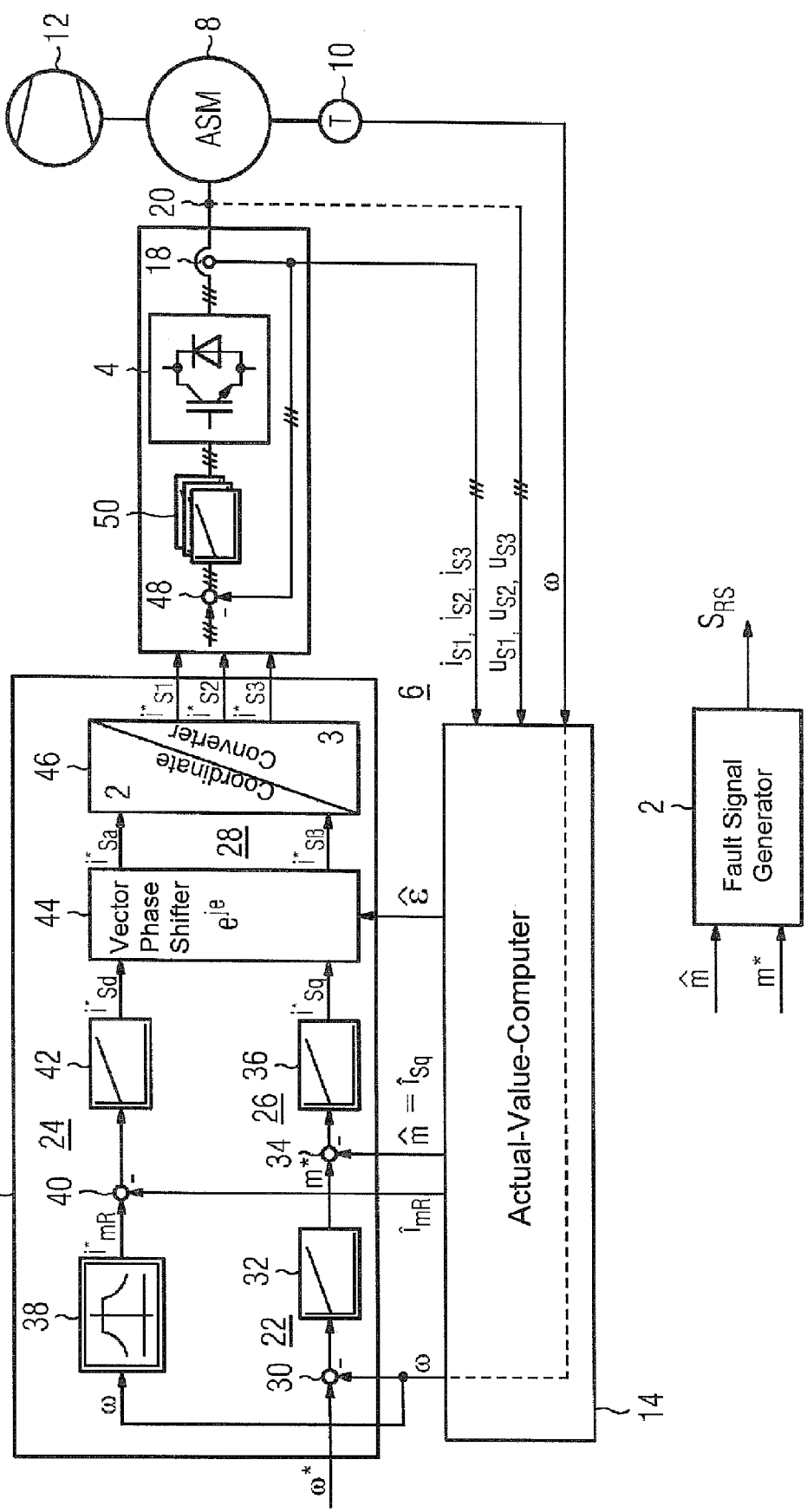
FIG. 1 shows a block circuit diagram of a converter-fed compressor with a device for carrying out the method according to the invention, and in FIG. 2 a characteristic of a measured armature current in the event of a "rotating stall" fault is shown in a diagram with respect to time.

In FIG. 1, a device for carrying out the method according to the invention is designated by 2, a load-side converter by 4, a field-oriented closed-loop control system by 6, a three-phase motor by 8, a unit for measuring a speed-proportional signal ω by 10, and a compressor by 12. The three-phase motor 8 is connected on the stator side to outputs of the load-side converter 4, which is also referred to as an inverter. The compressor 12 and the unit 10 for measuring a speed-proportional signal ω are mechanically connected to the rotor of the three-phase motor 8. The load-side converter 4 is part of a voltage source converter. On the DC side, this load-side converter 4 is connected to a voltage source DC link circuit to which a mains-side converter is also connected on the DC side. Only the load-side converter 4 of this voltage source converter is shown for reasons of clarity.

The field-oriented closed-group control system 6 has an actual value computer 14 and a setpoint computer 16. The actual value computer 14, very often also referred to as a flux computer, is connected to measuring devices 18 and 20 for output currents $i_{S1}$, $i_{S2}$ and $i_{S3}$ and output voltages $u_{S1}$, $u_{S2}$ and $u_{S3}$ of the load-side converter 4. The actual value computer 14, which has a current and a voltage model for example, calculates orthogonal, field-oriented current components $\hat{i}_{mR}$ and $\hat{i}_{Sq}$ and a flux orientation $\hat{\epsilon}$ from these measured values $i_{S1}$, $i_{S2}$, $i_{S3}$ and $u_{S1}$, $u_{S2}$, $u_{S3}$ and parameters of the three-phase machine 8. If the actual value computer 14 has a current model, then as well as the measured output currents $i_{S1}$, $i_{S2}$ and $i_{S3}$ of the load-side converter 4, this current model also needs a speed-proportional signal ω. This signal ω is likewise required in the setpoint computer 16 and therefore this signal ω is shown with a dotted line in the actual value computer 14. As the calculated actual values $\hat{i}_{mR}$, $\hat{i}_{Sq}$ and $\hat{\epsilon}$ are model variables, these are shown with a "^" in each case.

The setpoint computer 16 has a speed control loop 22, a flux control loop 24 and a torque control loop 26 on the one hand, and a transformation device 28 on the other. The speed control loop 22 has a comparator 30 and a speed controller 32. The torque control loop 26 likewise has a comparator 34 and a controller 36. This torque control loop 26 is subordinate to the speed control loop 22. From a predetermined setpoint ω* and an established speed-proportional signal ω, the comparator 30 forms a control deviation which is controlled to zero by means of the speed controller 32. A torque setpoint m* appears at the output of this speed controller 32 and is compared by means of the comparator 34 with an estimated value of torque $\hat{m}$, which is proportional to the established current component $\hat{i}_{Sq}$. The estimated value of torque $\hat{m}$ is made to follow the torque setpoint m* by means of the controller 36, at the output of which a setpoint of an orthogonal current component $\hat{i}_{Sq}$ appears. The orthogonal current component $\hat{i}_{Sq}$ is also referred to as a torque-forming current component and is a current component of the field-oriented "motor current" current vector. A flux setpoint generator 38, the output side of which is connected to an input of the comparator 40 of the flux control loop 24, is connected upstream of the flux control loop 24. The calculated estimated value of the orthogonal current component $\hat{i}_{mR}$ appears at an inverting input of this comparator 40. This comparator is connected on the output side to a flux controller 42, at the output of which a setpoint of a second orthogonal current component $i^*_{Sd}$ appears. This second orthogonal current component $i^*_{Sd}$ is also referred to as a flux-forming current component. These two current components $i^*_{Sd}$ and $i^*_{Sq}$ are converted into orthogonal stator-oriented current components $i^*_{S\alpha}$ and $i^*_{S\beta}$ by means of a vector phase shifter 44 at the angle input of which a calculated flux angle estimated value $\hat{\epsilon}$ appears. Three current setpoints $i^*_{S1}$, $i^*_{S2}$ and $i^*_{S3}$ of a three-phase current system are produced from these orthogonal, stator-oriented current components $i^*_{S\alpha}$ and $i^*_{S\beta}$ means of a coordinate converter 46. These current setpoints $i^*_{S1}$, $i^*_{S2}$ and $i^*_{S3}$ are fed phase-by-phase to a comparator 48 in each case, which is connected on the output side to a current controller 50 in each case. These comparators 48 are also each connected on the input side to a measuring device 18.

The device 2 for carrying out the method according to the invention processes the variables estimated value of torque $\hat{m}$ and torque setpoint m* of the drive consisting of load-side converter 4 and three-phase motor 8 with compressor 12 in accordance with the method according to the invention. The result is a signal $S_{RS}$ which signals that the "rotating stall" fault is occurring. In order to generate this signal $S_{RS}$, the two torque signals $\hat{m}$ and m* are compared with one another, the torque setpoint m* being a fixed value. Since this torque setpoint m* is determined by means of a superimposed speed control loop 22, this torque setpoint m* depends on the operating point. If the calculated estimated value of torque $\hat{m}$ does not correspond to the fixed torque setpoint m*, then the "rotating stall" fault is present.

Figure 2:
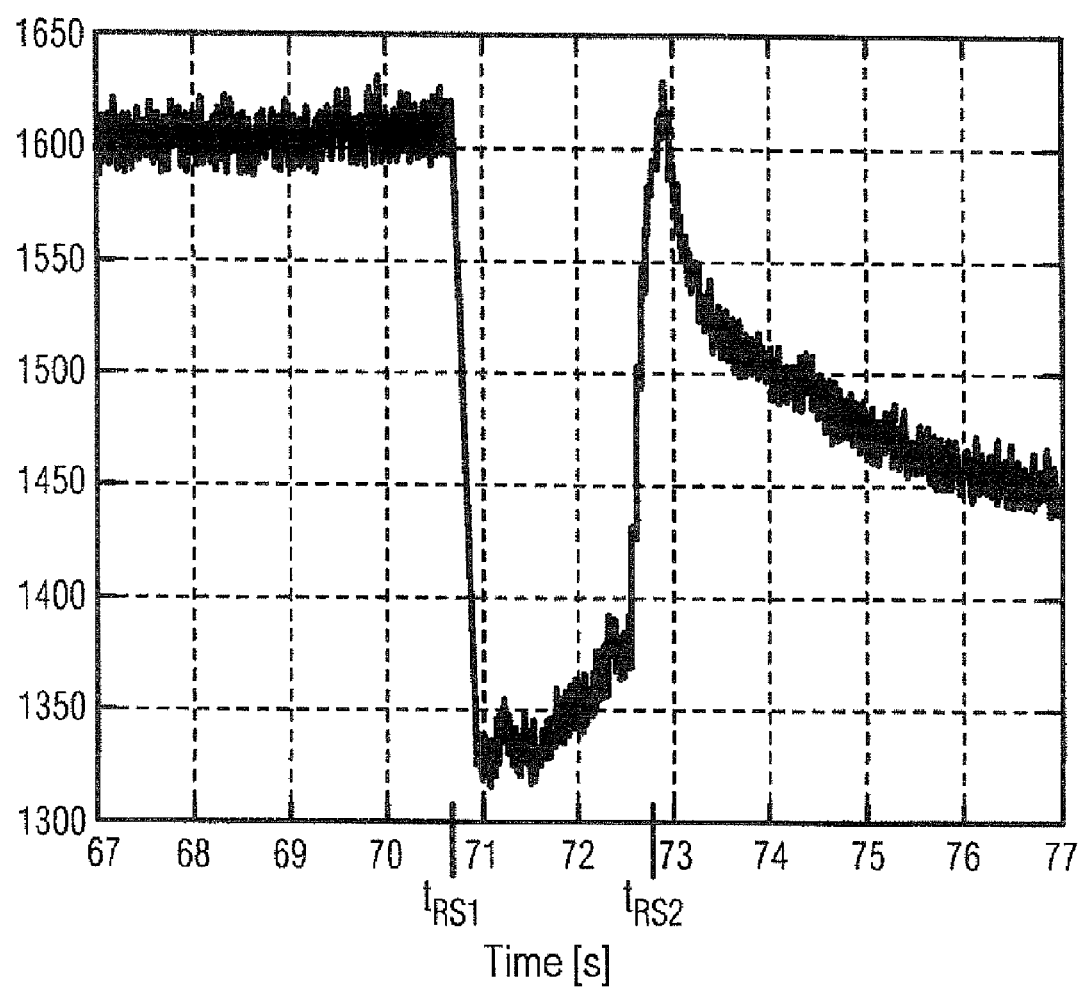

A diagram of the characteristic of a measured armature current of the three-phase machine 8 with coupled compressor 12 with respect to time when a "rotating stall" fault occurs at a speed n=17000 rpm is shown in FIG. 2. At time $t_{RS1}$, the armature current dips steeply and increases again at time $t_{RS2}$. This armature current has dipped as a result of the "rotating stall" fault.

In order to detect the occurrence of the "rotating stall" fault at time $t_{RS1}$ as soon after this time $t_{RS1}$ as possible, the estimated value of torque $\hat{m}$, which is proportional to the torque-forming current component $\hat{i}_{Sq}$ of the three-phase motor 8, is filtered, this filter having differential elements. That is to say, when the "rotating stall" fault occurs at time $t_{RS1}$, the filtered estimated value of torque $\hat{m}$ changes its value in a step fashion while the fixed torque setpoint m* remains constant. In order also to be able to detect the "rotating stall" fault during a load change, a established setpoint/actual value deviation of the torque, which appears at the output of the comparator 34 of the torque control loop 26 in the form of a control deviation, is compared with a predetermined maximum value. If this maximum value is exceeded, then the "rotating stall" fault is occurring during a load change.

With a compressor which is driven by means of a converter-fed three-phase motor 8, this method according to the invention enables additional pressure sensors and/or vibration recorders to be dispensed with, wherein the disadvantages of these additional elements in the compressor 12 also no longer arise. In addition, the "rotating stall" fault is detected reliably and synchronously in time with the instant of its occurrence, enabling countermeasures to be taken in good time.

These measures are:

Reducing the speed:
  To do this, it is first necessary to reduce the motor torque so that a counter torque of the compressor 12 can act as a brake. The objective is to reduce the mass flow in order to achieve a new stable operating point.

Increasing the speed:
  This requires initially increasing the motor torque. The objective is to increase the mass flow and as a result reach a stable operating point once more.

With the method according to the invention, already existing signals of the converter-fed three-phase motor 8 are used to be able to detect this "rotating stall" fault immediately after it has occurred. This method according to the invention can be integrated within the converter in the form of application software. By this means, any compressor 12 which is driven by such a converter-fed three-phase motor 8 can be monitored with regard to the "rotating stall" fault without additional outlay.

What is claimed is:

1. A method for detecting a "rotating stall" fault in a compressor driven by a converter-fed three-phase motor, comprising the steps of:
  measuring converter output currents and a signal proportional to a motor speed;
  calculating from the measured converter output currents and the measured speed-proportional signal an estimated torque value;
  computing a torque value difference between the estimated torque value and a nominal torque value determined from the measured speed-proportional signal and a predetermined speed-proportional signal; and
  if the computed torque value difference is greater than an operating-point-dependent stationary value, generating a fault signal which indicates that a "rotating stall" fault has occurred.

2. The method of claim 1, further comprising the step of differentiating the calculated estimated torque value.

3. The method of claim 1, further comprising the step of differentiating the determined nominal torque value.

4. The method of claim 1, wherein the operating-point-dependent stationary value is set to zero.

5. The method of claim 1, wherein the estimated torque value and the nominal torque value are filtered.

6. The method of claim 1, wherein the torque value difference is filtered.

7. The method of claim 1, wherein the fault signal generates an alarm signal.

* * * * *